United States Patent
Tsirkin

(10) Patent No.: US 10,176,007 B2
(45) Date of Patent: Jan. 8, 2019

(54) GUEST CODE EMULATION BY VIRTUAL MACHINE FUNCTION

(71) Applicant: Red Hat Israel, Ltd., Ra'anana (IL)

(72) Inventor: Michael Tsirkin, Raanana (IL)

(73) Assignee: Red Hat Israel, Ltd., Ra'anana (IL)

( * ) Notice: Subject to any disclaimer, the term of this patent is extended or adjusted under 35 U.S.C. 154(b) by 158 days.

(21) Appl. No.: 15/252,065

(22) Filed: Aug. 30, 2016

(65) Prior Publication Data

US 2018/0060103 A1    Mar. 1, 2018

(51) Int. Cl.
G06F 9/455    (2018.01)

(52) U.S. Cl.
CPC ...... *G06F 9/45558* (2013.01); *G06F 9/45545* (2013.01); *G06F 2009/45583* (2013.01)

(58) Field of Classification Search
CPC .............. G06F 9/45558; G06F 9/45545; G06F 2009/45583
See application file for complete search history.

(56) References Cited

U.S. PATENT DOCUMENTS

| | | |
|---|---|---|
| 6,895,491 B2 | 5/2005 | Kjos et al. |
| 7,213,125 B2 | 5/2007 | de Dinechin et al. |
| 7,330,942 B2 | 2/2008 | de Dinechin et al. |
| 7,478,388 B1 * | 1/2009 | Chen ................... G06F 9/45554 718/1 |
| 7,478,394 B1 | 1/2009 | de Dinechin et al. |
| 7,577,944 B2 | 8/2009 | de Dinechin |
| 7,613,847 B2 | 11/2009 | Kjos et al. |
| 7,765,238 B2 | 7/2010 | de Dinechin et al. |
| 7,996,833 B2 | 8/2011 | de Dinechin et al. |
| 8,091,090 B2 | 1/2012 | de Dinechin et al. |
| 8,505,020 B2 | 8/2013 | de Dinechin et al. |
| 8,694,819 B2 | 4/2014 | de Dinechin et al. |

(Continued)

OTHER PUBLICATIONS

Wenhao Li et al. "Reducing World Switches in Virtualized Environment with Flexible Cross-world Calls" http://ipads.se.sjtu.edu.cn/_media/publications/crossover-isca15.pdf, Shanghai Key Laboratory of Scalable Computing and Systems Shanghai Jiao Tong University, Jun. 13-17, 2015, 13 pages.

(Continued)

*Primary Examiner* — Adam Lee
(74) *Attorney, Agent, or Firm* — Haynes and Boone, LLP

(57) ABSTRACT

Systems and methods are provided for emulating guest code by a virtual machine function. An example method includes detecting, by a hypervisor, a request by a guest to access a resource. The guest includes a virtual machine function and kernel code, and runs on a virtual machine. The virtual machine and the hypervisor run on a host machine, which includes virtual machine function memory. The method also includes in response to detecting the request to access the resource, transferring, by the hypervisor, control of a virtual central processing unit (CPU) allocated to the guest to the virtual machine function. The method further includes receiving an indication that the virtual machine function has completed the access request on behalf of the guest. The virtual machine function may modify a state of the virtual CPU in virtual machine function memory. The method also includes synchronizing, by the hypervisor, a virtual machine function memory with the virtual CPU state.

20 Claims, 6 Drawing Sheets

(56) References Cited

U.S. PATENT DOCUMENTS

| | | | |
|---|---|---|---|
| 9,268,707 B2 | 2/2016 | Sahita et al. | |
| 9,411,630 B1* | 8/2016 | Adams | G06F 9/45558 |
| 9,870,324 B2* | 1/2018 | Mattson, Jr. | G06F 12/145 |
| 2002/0029308 A1* | 3/2002 | Babaian | G06F 9/45504 |
| | | | 710/240 |
| 2007/0016755 A1* | 1/2007 | Pratt | G06F 12/1009 |
| | | | 711/207 |
| 2007/0101099 A1* | 5/2007 | Shinohara | G06F 12/1036 |
| | | | 711/207 |
| 2008/0244535 A1* | 10/2008 | Nelson | G06F 9/45558 |
| | | | 717/129 |
| 2008/0256327 A1* | 10/2008 | Jacobs | G06F 9/4856 |
| | | | 711/207 |
| 2009/0007112 A1* | 1/2009 | Moriki | G06F 9/45558 |
| | | | 718/1 |
| 2009/0100250 A1* | 4/2009 | Chen | G06F 9/45554 |
| | | | 712/43 |
| 2009/0228882 A1* | 9/2009 | Wang | G06F 9/5077 |
| | | | 718/1 |
| 2009/0300263 A1* | 12/2009 | Devine | G06F 12/1009 |
| | | | 711/6 |
| 2010/0223611 A1* | 9/2010 | Mahalingam | G06F 9/45537 |
| | | | 718/1 |
| 2011/0082962 A1* | 4/2011 | Horovitz | G06F 11/301 |
| | | | 711/6 |
| 2011/0131389 A1* | 6/2011 | Gremaud | G06F 8/67 |
| | | | 711/206 |
| 2011/0296411 A1* | 12/2011 | Tang | G06F 9/45545 |
| | | | 718/1 |
| 2012/0151116 A1* | 6/2012 | Tuch | G06F 12/1009 |
| | | | 711/6 |
| 2012/0324236 A1* | 12/2012 | Srivastava | G06F 21/57 |
| | | | 713/189 |
| 2013/0091568 A1* | 4/2013 | Sharif | G06F 21/50 |
| | | | 726/22 |
| 2013/0276057 A1 | 10/2013 | Smith et al. | |
| 2013/0283004 A1* | 10/2013 | Devine | G06F 12/1009 |
| | | | 711/206 |
| 2014/0013326 A1 | 1/2014 | Neiger et al. | |
| 2014/0173628 A1 | 6/2014 | Ramakrishnan | |
| 2014/0208034 A1* | 7/2014 | Rice | G06F 12/0808 |
| | | | 711/130 |
| 2014/0281366 A1* | 9/2014 | Felch | G06F 12/0886 |
| | | | 711/207 |
| 2014/0380009 A1 | 12/2014 | Lemay et al. | |
| 2015/0058861 A1* | 2/2015 | Zheng | H04L 47/56 |
| | | | 718/104 |
| 2015/0212956 A1* | 7/2015 | Tsirkin | G06F 13/34 |
| | | | 710/263 |
| 2015/0370591 A1* | 12/2015 | Tuch | G06F 9/45558 |
| | | | 718/1 |
| 2015/0378633 A1 | 12/2015 | Sahita et al. | |
| 2016/0048464 A1* | 2/2016 | Nakajima | G06F 12/1475 |
| | | | 711/152 |
| 2017/0185436 A1* | 6/2017 | Deng | G06F 9/45558 |
| 2017/0185531 A9* | 6/2017 | Chen | G06F 12/1408 |
| 2018/0004943 A1* | 1/2018 | Lukacs | G06F 21/554 |

OTHER PUBLICATIONS

Adam Belay et al. "Dune: Safe User-level Access to Privileged CPU Features" Stanford University, http://www.scs.stanford.edu/~abelay/pdf/belay:dune.pdf, accessed May 17, 2016, 14 pages.

Yutao Liu et al. "Thwarting Memory Disclosure with Efficient Hypervisor-Enforced Intra-Domain Isolation" Shanghai Key Laboratory of Scalable Computing and Systems & Institute of Parallel and Distributed Systems Shanghai Jiao Tong University, Shanghai, China, Oct. 12-16, 2015, 13 pages.

Jun Nakajima, "Re: [Qemu-Devel] Rfc: vHost user Enhancements for vm2vm Communication" https://lists.gnu.org/archive/html/qemu-devel/2015-09/msg00273.html, Intel Open Source Technology Center, Sep. 1, 2015, 3 pages.

* cited by examiner

GUEST CODE EMULATION BY VIRTUAL MACHINE FUNCTION

BACKGROUND

The present disclosure generally relates to computing devices, and more particularly to emulating guest code by a virtual machine function.

A virtual machine is software that is executed on hardware to create a virtualization of a physical computer system. Virtual machines may function as self-contained platforms that run their own operating systems and software applications. A host machine, such as a server computer may concurrently run one or more virtual machines using a hypervisor. The hypervisor allocates a certain amount of the host's resources, such as the host's underlying physical processors and memory devices, to each of the virtual machines, allowing the virtual machines to transparently access the host's resources. Each virtual machine may use the allocated resources to execute applications, including operating systems referred to as guest operating systems. Each virtual machine guest operating system may be accessed by one or more local or remote clients to perform computing tasks.

BRIEF SUMMARY

Methods, systems, and techniques for emulating guest code by a virtual machine function are provided.

An example method of emulating guest code by a virtual machine function includes detecting, by a hypervisor, a request by a guest to access a resource. The guest includes a virtual machine function and kernel code, and runs on a virtual machine. The virtual machine and the hypervisor run on a host machine, which includes virtual machine function memory. The method also includes in response to detecting the request to access the resource, transferring, by the hypervisor, control of a virtual central processing unit (CPU) allocated to the guest to the virtual machine function. The method further includes receiving an indication that the virtual machine function has completed the access request on behalf of the guest. The virtual machine function may modify a state of the virtual CPU in virtual machine function memory. The method also includes synchronizing, by the hypervisor, the virtual machine function memory with the virtual CPU state.

An example system for emulating guest code by a virtual machine function includes a memory region storing a first state of a virtual CPU allocated to a guest. The memory region is shared between a virtual machine function and a hypervisor. The guest runs on a virtual machine and includes the virtual machine function and kernel code. The system also includes a control module that detects a request by the guest to access a resource. In response to detecting the request to access the resource, the control module transfers control of the virtual CPU to the virtual machine function. The system further includes a synchronizer that receives an indication that the virtual machine function has completed the access request on behalf of the guest, identifies one or more differences between a second state of the virtual CPU maintained by the synchronizer and the first state, and synchronizes the virtual machine function memory in accordance with the one or more differences.

An example non-transitory machine-readable medium includes a plurality of machine-readable instructions that when executed by one or more processors are adapted to cause the one or more processors to perform a method including: detecting, by a hypervisor, a request by a guest to access a resource, the guest including a virtual machine function and kernel code, the guest running on a virtual machine, and the virtual machine and the hypervisor running on a host machine; in response to detecting the request to access the resource, transferring, by the hypervisor, control of a virtual central processing unit (CPU) allocated to the guest to the virtual machine function; receiving an indication that the virtual machine function has completed the access request on behalf of the guest, where the virtual machine function modifies a state of the virtual CPU in virtual machine function memory; and synchronizing, by the hypervisor, a virtual machine function memory with the virtual CPU state.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

DETAILED DESCRIPTION

Figure 1:
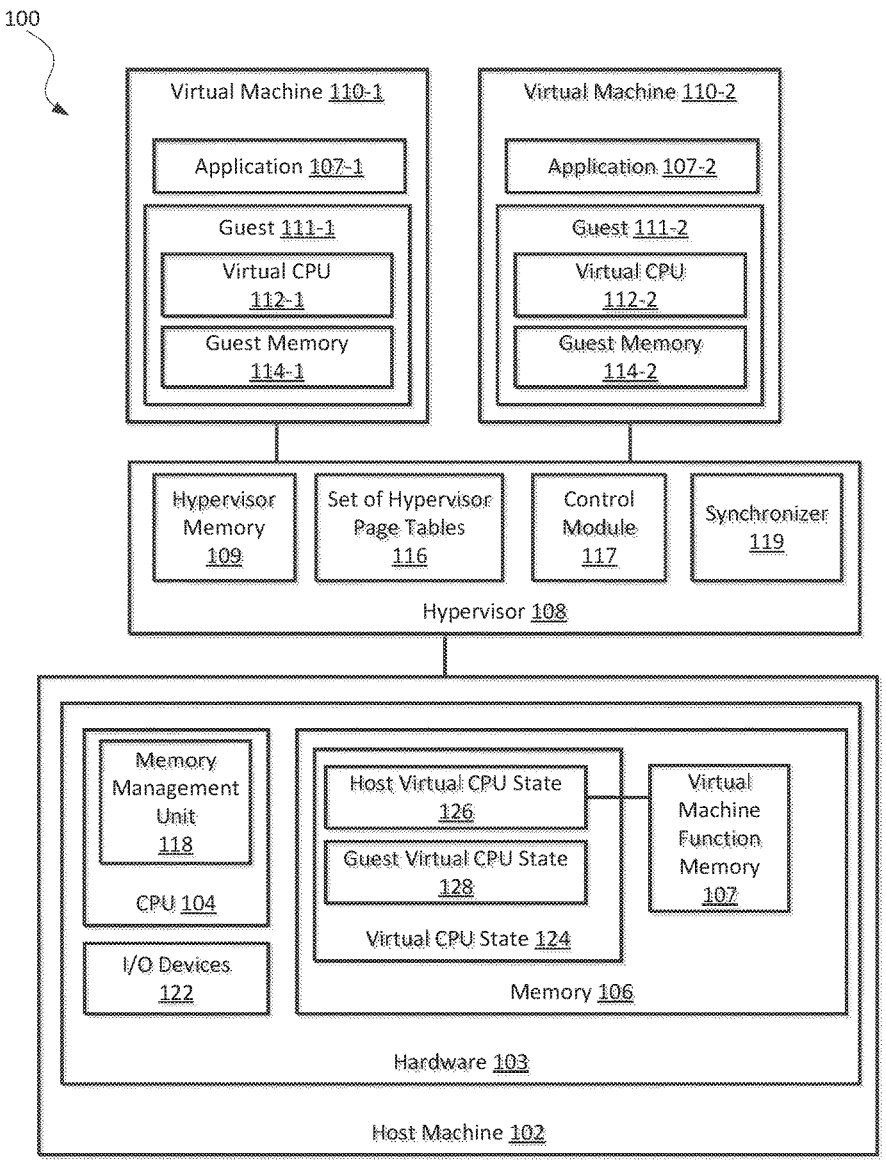
FIG. 1 is an example diagram showing a host system.

It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting.

A hypervisor virtualizes the underlying hardware of the host machine and may emulate hardware devices, making the use of the virtual machine transparent to the guest operating system or the remote client that uses the virtual machine. With an emulated device, the emulation can run on any physical server, independent of the specifics of the physical device. An emulated device may be a device that is implemented by the hypervisor and is exposed to the guest as part of the virtual machine. In an example, the emulated device may be a purely virtual device that mimics real hardware. In such an example, the emulated device may be implemented using full emulation such that the device driver to which the emulated device is assigned may work on the hardware coupled to the host machine. In another example, the emulated device may be a para-virtualized device that is controlled by a device driver that is written for a specific hypervisor. In such an example, the emulated device may be implemented using para-virtualization such that the device driver to which the emulated device is assigned does not work on the hardware coupled to the host machine.

In emulation, an access request by the guest can be executed by the hypervisor on behalf of the guest. Emulation code within the hypervisor may be complex and result in security concerns. For example, emulation code within the hypervisor may have software bugs that allow privileged instructions to be executed by the hypervisor on behalf of the guest. This problem may be addressed by reducing the emulation code within the hypervisor.

To reduce the emulation code within the hypervisor, rather than have the hypervisor perform the access request on behalf of the guest, it may be desirable to keep this functionality on the guest and provide a virtual machine function within the guest to perform this access request. A virtual machine function is a technique for improving performance and security for virtual systems. At a high level, the hypervisor may prevent a guest from accessing a resource unless executing a virtual machine function, and may also prevent the guest from accessing the virtual machine function except by specific instructions. For example, on x86 CPUs, virtual machine functions may be implemented by switching extended page tables (EPTs), where particular EPTs are selected depending on whether a virtual machine function is used. To access a virtual machine function, the guest executes a virtual machine function instruction, which can be executed by CPU hardware or emulated by the hypervisor.

The virtual machine function may be considered a "special mode" in which the guest may execute. The virtual machine may be switched to a different and more privileged mode, which limits what code may be run within the virtual machine. In this example, an access request may be sent to the virtual machine function within the virtual machine. The communication between the guest and virtual machine may be para-virtualized. The use of virtual machine functions in this way, however, may also have disadvantages. For example, modification of the guest to include the virtual machine function may complicate maintenance and reduce system performance and security. For example, to use the virtual machine function, a special driver is written and loaded into the guest. This problem may be addressed by using a virtual machine function, without modifying the guest.

In some examples, the use of the virtual machine function without modification of the guest includes a virtual machine function that "sits" between the guest and hypervisor. In an example, the virtual machine function performs an access on behalf of the guest, without modification of the guest, in a virtualization system, a CPU may execute in a special mode, such as a guest mode or a hypervisor mode. If a virtual CPU is in the guest mode, the guest including the virtual CPU has control of the virtual CPU. If the virtual CPU is in the hypervisor mode, the hypervisor has control of the virtual CPU. A virtual CPU state includes a host virtual CPU state, which is the state of the virtual CPU from the hypervisor's perspective, and a guest virtual CPU state, which is the state of the virtual CPU from the guest's perspective. The virtual machine function may be able to access the virtual CPU state. For example, the virtual machine function may perform an access on behalf of the guest and accordingly modify the guest virtual CPU state based on the access. In some examples, the virtual machine function reads from the host virtual CPU state and modifies the guest virtual CPU state. In an example, the host virtual CPU state provides an indication of the guest's access request. In this example, the virtual machine function reads the host virtual CPU state to determine the guest's access request and performs this access request on behalf of the guest.

After the virtual machine function completes the access request, control may be transferred to the hypervisor. The hypervisor may maintain its own state of the CPU in virtual machine function memory, which may now be different from the virtual CPU state modified by the virtual machine function. To rectify this difference, the hypervisor may synchronize the virtual machine function memory with the virtual CPU state, which may have been modified by the virtual machine function in response to performing an access on behalf of the guest. It may be advantageous for the hypervisor to synchronize the virtual machine function memory with the virtual CPU state because the virtual machine function may emulate the guest's access request, without having to modify the guest (e.g., by loading a special driver into the guest). Accordingly, by providing the virtual machine function access to the guest virtual CPU state and host virtual CPU state of a virtual machine, the guest may be used as-is, without modifications. The use of a virtual machine function to emulate guest code may have some performance costs compared to emulation by a hypervisor, but provides improved security over emulation by the hypervisor.

The present disclosure provides techniques for emulating guest code by a virtual machine function. Unless specifically stated otherwise, as apparent from the following discussion, it is appreciated that throughout the description, discussions utilizing terms such as "determining," "storing," "detecting," "receiving," "sending," "loading," "executing," "identifying," "modifying," "transferring," "setting," "synchronizing," "providing," "copying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 is an example diagram showing an illustrative host system 100. According to the present example, a physical system, such as host machine 102 includes hardware 103 such as CPU 104 for executing software (e.g., machine-readable instructions) and using or updating data stored in memory 106. Hardware 103 may include more than one CPU 104. A "CPU" may also be referred to as a "processor" or "physical processor" herein. A CPU shall refer to a device capable of executing instructions encoding arithmetic, logical, or input/output (I/O) operations. In an example, a CPU may follow the Von Neumann architectural model and may include an arithmetic logic unit (ALU), a control unit, and a plurality of registers. In a further aspect, a CPU may be a single-core CPU that is typically capable of executing one instruction at a time (or processing a single pipeline of instructions), or a multi-core CPU that may simultaneously execute multiple instructions. In another aspect, a CPU may be implemented as a single-integrated circuit, two or more integrated circuits, or may be a component of a multi-chip module (e.g., in which individual microprocessor dies are included in a single integrated circuit package and hence share a single socket).

Memory 106 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory." The various types of memory may store information in the form of software and data. The software may include an operating system, a hypervisor 108, and various other software applications. Hardware 103 may include other I/O devices 122.

Host machine 102 may be coupled over a network (not shown). The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Host machine 102 may run one or more virtual machines that run applications 107 and services. A hypervisor 108 manages resources of host machine 102 and makes them available to one or more guests that may be alternately or concurrently executed by host machine 102. Hypervisor 108 may manage hardware resources and arbitrate requests of the multiple guests. For example, hypervisor 108 may present a virtual set of CPUs, memory, input/output (I/O), and disk resources to each guest based on the physical hardware and/or based on a standard and consistent selection of custom hardware. A virtual machine is provided its own address space in memory, its own CPU resource allocation, and its own device I/O using its own virtual devices.

Virtual machines 110 are platforms on which OSs referred to as guest OSs run. A guest OS may be referred to as a "guest." A guest 111-1 running on first virtual machine 110-1 may be a different OS than guest 111-2 running on the second virtual machine 110-2. A guest may also be a different OS than the OS running on host machine 102. In the example illustrated in FIG. 1, hypervisor 108 supports virtual machine 110-1 having a virtual CPU 112-1 and guest memory 114-1. Hypervisor 108 also supports a virtual machine 110-2 having a virtual CPU 112-2 and guest memory 114-2. Although two virtual machines 110 are illustrated, host system 100 may include fewer than or more than two virtual machines.

The hardware resources of host machine 102 are shared among hypervisor 108 and one or more guests. Hypervisor 108 may map a virtual resource or state (e.g., registers, memory, or files) to resources in the underlying host machine 102. A guest 111-1, 111-2 may execute one or more applications 107-1, 107-2 that use resources of host machine 102. An application running on guest 111 may access a kernel through the use of system calls. The kernel abstracts components of hardware on a high level such that the application may send a request that is processed by a hardware device, without knowing the fine details of the hardware device. To interact with the hardware device, the application may invoke a system call into the kernel. For example, an application may send an I/O request to the kernel via a system call to request that a particular hardware device perform a particular action. A system call may refer to a request by an active process for a service performed by the kernel. An example request may be a write request to one or more memory pages. A process is an executing instance of a program. An active process is a process that is currently processing in CPU 104, as contrasted with a process that is waiting for its next turn in CPU 104. I/O may be any program, operation, or device that transfers data to or from CPU 104 and to or from a hardware device (e.g., disk drives, keyboards, mice, and printers).

An application may have one or more processes executing on host machine 102. A guest may use a memory management technique called virtual memory, which maps virtual addresses used by an application into physical addresses in memory 106. CPU 104 includes a memory management unit (MMU) 118 that supports the use of virtual memory. With MMU 118, memory addresses may go through a translation step from a virtual address to a physical address prior to each memory access. In a virtual memory system, the addresses seen by user programs do not directly correspond to the physical addresses used by the hardware. Hypervisor 108 presents guest memory 114-1 to virtual machine 110-1 and presents guest memory 114-2 to virtual machine 110-2. Hypervisor 108 maps guest physical memory addresses of guest memory 114 to host physical memory addresses of memory 106 using page tables. Host physical memory refers to the memory that is visible by hypervisor 108 as available on the system. Guest physical memory refers to the memory that is visible to the guest running in the virtual machine and is backed by host physical memory. Hypervisor 108 may sit between the guest physical memory and MMU 118 on CPU 104. Memory 106 may include random access memory (RAM), and MMU 118 may divide the RAM into pages. A page is a contiguous section of memory of a set size that is handled by MMU 118 as a single entity. Guest virtual memory refers to a continuous virtual address space presented by the guest to one or more applications. The guest may present a virtual address space to the applications running on the guest. Guest virtual memory is visible to the applications running inside the virtual machine.

Virtual memory addresses may be mapped to physical memory addresses using one or more data structures. A data structure may be a page table. A page table may be a guest page table or a hypervisor page table. A guest page table (not shown) is a data structure in virtual memory that stores mappings between the guest virtual addresses and the guest physical addresses. Hypervisor 108 includes a hypervisor memory 109 that stores data maintained by the hypervisor. Hypervisor memory 109 includes a set of hypervisor page tables 116. A hypervisor page table is a data structure in hypervisor memory 109 that stores mappings between the guest addresses of guest memory 114 and the host physical addresses of memory 106. A hypervisor page table may also be referred to as an Extended Page Table (EPT). In some examples, hypervisor 108 maintains the virtual-to-physical page mappings in a set of shadow page tables. In some examples, a hypervisor page table may refer to a hypervisor data structure from which the hypervisor constructs the EPTs or the shadow page tables.

Additionally, a hypervisor page table may store access permissions for one or more memory pages (e.g., in guest memory 114). Examples of access permission modes are read-only, write-only, write-protected (e.g., read-execute only), read-write only, and read-write-execute only. In the example illustrated in FIG. 1, set of hypervisor page tables 116 may include one or more page table entries, where a page table entry specifies a guest memory page allocated to a guest and the access permissions of the guest memory page. A page table entry may have a permission bit indicating whether the memory page is writable, a permission bit indicating whether the memory page is readable, and a permission bit indicating whether the memory page is executable. In the present disclosure, if a range of memory addresses is in a particular mode (e.g., write-protected mode) in a set of hypervisor page tables, then the memory pages located within the range of memory addresses are also in the particular mode (e.g., write-protected mode).

Hypervisor 108 also includes a control module 117 and synchronizer 119. As will be explained further below, control module 117 detects a request by a guest to access a resource, and transfers control from the guest to the hypervisor or transfers control from the hypervisor to the guest. The resource may be a memory resource. In some examples, transferring control of the virtual CPU to the virtual machine function and back to the kernel code includes switching between a first set of hypervisor page tables associated with the virtual machine function and a second set of hypervisor page tables associated with the kernel code. In some examples, the first set of hypervisor page tables grants access to the resource, and the second set of hypervisor page tables does not grant access to the resource.

For example, control module 117 transfers control of virtual CPU 112-1 from guest 111-1 to hypervisor 108 and/or from hypervisor 108 to guest 111-1. A virtual machine exit may cause control to be transferred from guest 111-1 to hypervisor 108. A virtual machine exit marks the point at which a transition is made between the virtual machine currently running and hypervisor 108. A virtual machine entry may cause control to be transferred from hypervisor 108 to guest 111-1. A virtual machine entry marks the point at which a transition is made between hypervisor 108 and the virtual machine.

In the example illustrated in FIG. 1, memory 106 includes virtual machine function memory 107. Virtual machine function memory may be, for example, random access memory, non-volatile memory, CPU cache, CPU registers, or any other memory accessible to the virtual machine function. In a virtualization system, a CPU may execute in a special mode, such as a guest mode or a hypervisor mode. If the virtual CPU is in the guest mode, the guest including the virtual CPU has control of the virtual CPU. If the virtual CPU is in the hypervisor mode, hypervisor 108 has control of the virtual CPU. A virtual CPU state 124 is stored in memory 106. In an example, virtual CPU state 124 stores the state of virtual machine 110-1 and in particular may store the state of virtual CPU 112-1. Virtual CPU state 124 may be stored in hypervisor memory 109 and/or CPU 104. In an example, at least a portion of virtual CPU state 124 is stored in a cache within CPU 104 and is backed by hypervisor memory 109. Virtual CPU state 124 may be accessible by hypervisor 108. CPU 104 may execute instructions to recognize virtual CPU state 124 and/or access it directly within the CPU.

Virtual CPU state 124 includes a host virtual CPU state 126 and a guest virtual CPU state 128. Host virtual CPU state 126 and guest virtual CPU state 128 may correspond to a state of virtual CPU 112-1, but from different perspectives. For example, host virtual CPU state 126 stores information about virtual CPU 112-1 from the point of view of hypervisor 108, and guest virtual CPU state 128 stores information about virtual CPU 112-1 from the point of view of guest 111-1. In some examples, host virtual CPU state 126 stores an exit status indicating a cause of a virtual machine exit (e.g., a request by a guest to access a resource), exit qualification, etc. In some examples, guest virtual CPU state 128 stores a state of virtual CPU 112-1's registers, instruction pointers, current instruction pointer, mode (e.g., guest mode or hypervisor mode), etc.

Figure 2:
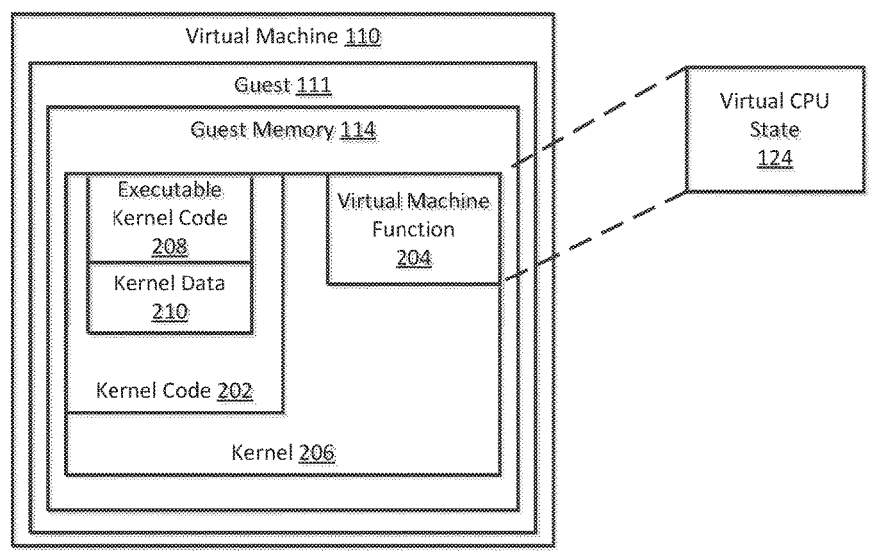
FIG. 2 is an example block diagram illustrating a system for guest code emulation by a virtual machine function.

FIG. 2 is an example block diagram 200 illustrating a system for guest code emulation by a virtual machine function. In the example illustrated in FIG. 2, guest 111 runs on virtual machine 110 and includes guest memory 114. Guest memory 114 includes a kernel 206 that serves as an intermediary between hardware and software (e.g., an application running on guest 111). Kernel 206 includes kernel code 202, which includes executable kernel code 208 and kernel data 210, and virtual machine function 204. Virtual machine function 204 is special code that is run within guest 111 and is given a higher privilege than is given to guest 111. For example, virtual machine function 204 may be granted special permissions to access particular resources, while other code within guest 111 is denied such access. In an example, virtual machine function 204 has permission to write to a memory page that guest 111 does not have permission to modify.

Virtual CPU state 124 is mapped into memory in set of hypervisor page tables 116 for virtual machine function 204. Virtual machine function 204 may access virtual CPU state 124 by, for example, reading from host virtual CPU state 126 and modifying guest virtual CPU state 128 in virtual machine function memory. Hypervisor 108 may allow virtual machine function 204 access to guest virtual CPU state 128 and/or host virtual CPU state 126 of virtual CPU state 124. In an example, one or more page table entries in set of hypervisor page tables 116 may specify that host virtual CPU state 126 is write protected (e.g., read-only) and guest virtual CPU state 128 is writeable. In some examples, hypervisor 108 makes portions of virtual CPU state 124 accessible to virtual machine function 204 by copying at least a portion of virtual CPU state 124 into memory shared between virtual machine function 204 and hypervisor 108. In an example, virtual machine function 204 may access this shared memory to read from host virtual CPU state 126 and/or to modify guest virtual CPU state 128 in virtual machine function memory.

Virtual CPU state 124 may be mapped into memory of virtual machine function 204. In some examples, guest 111-1's virtual CPU state 124 is writeable and/or host virtual CPU state 126 is read-only by virtual machine function 204. For example, set of hypervisor page tables 116 may store permissions of a first set of memory page(s) storing guest virtual CPU state 128 and a second set of memory page(s) storing host virtual CPU state 126. In this example, one or more page table entries that lists the first set of memory page(s) specifies that the first set of memory page(s) is writable, and/or one or more page table entries that lists the second set of memory page(s) specifies that the second set of memory page(s) is read-only. Accordingly, guest virtual CPU state 128 of virtual CPU state 124 is modifiable, but host virtual CPU state 126 of virtual CPU state 124 is not modifiable by virtual machine function 204.

In some examples, hypervisor 108 maintains a first set of hypervisor page tables and a second set of hypervisor page tables in hypervisor memory 109, where the first set of hypervisor page tables is active if virtual machine function 204 does not have control of virtual CPU 112-1, and the second set of hypervisor page tables is active if virtual machine function 204 has control of virtual CPU 112-1. In this example, at most one of the first and second sets of hypervisor page tables is active at any one time. Each guest virtual CPU is restricted by the access permissions specified in the active hypervisor page table. In some examples, memory that is not accessible by guest 111 is mapped to the second set of hypervisor page tables, which may specify virtual machine function 204's access permissions to virtual CPU state 124. In an example, hypervisor 108 sets page table entries in the first set of hypervisor page tables to specify that host virtual CPU state 126 and guest virtual CPU state 128 are write protected (e.g., read-only), and page table entries in the second set of hypervisor page tables to specify that host virtual CPU state 126 is write protected (e.g., read-only) and guest virtual CPU state 128 is writeable. Accordingly, if kernel code 202 has control of virtual CPU 112-1, then the guest may not modify virtual CPU state 124, and if virtual machine function 204 has control of virtual CPU 112-1, then the virtual machine function may modify guest virtual CPU state 128 in virtual machine function memory.

Although in the above example, hypervisor 108 may switch between a first set of hypervisor page tables and a second set of hypervisor page tables, it should be understood that this is not intended to be limiting. For example, hypervisor memory 109 may include two or more hypervisor page tables that store different memory page access permissions. Additionally, one or more hardware CPUs may perform this functionality and include instructions to switch between sets of hypervisor page tables. In an example, the instructions to switch between the first set of hypervisor page tables and the second set of hypervisor page tables may be built within these sets of page tables. In another example, the switching between the first set of hypervisor page tables and the second set of hypervisor page tables may be executed via a CPU instruction such as virtual machine function 204.

In an example, guest 111 sends a request to perform an operation on a resource (e.g., write to a memory page), and virtual machine function 204 performs the operation on the resource on behalf of the guest. A series of events may occur in order for virtual machine function 204 to be able to perform the operation. In an example, control module 117 detects a requested access by the guest, and the requested access causes an exit to the hypervisor. Control module 117 may store information associated with the guest's access request into host virtual CPU state 126.

To fulfill the guest's request, control module 117 transfers control to virtual machine function 204, which reads from host virtual CPU state 126 to determine the cause of the exit and to fulfill the request on behalf of the guest. In an example, virtual machine function 204 determines that the cause of the exit was a write to a memory page, and virtual machine function 204 accordingly performs the requested write to the memory page on behalf of the guest. In another example, virtual machine function 204 determines that the cause of the exit was an input/output (I/O) port access request and which port the guest attempted to access. In this example, virtual machine function 204 may access the I/O port (e.g., a read from the I/O port) on behalf of the guest in accordance with the request. While performing the requested operation, virtual machine function 204 may modify virtual CPU state 124 (e.g., guest virtual CPU state 128) in virtual machine function memory.

After virtual machine function 204 performs the operation on the resource, virtual machine function 204 may send a request to hypervisor 108 to transfer control of virtual CPU 112-1 from virtual machine function 204 to kernel code 202. The request to transfer control to kernel code 202 may cause a virtual machine exit to hypervisor 108, which may then transfer control of virtual CPU 112-1 to kernel code 202. Upon entry of the hypervisor 108, the virtual machine function memory storing a state of virtual CPU 112-1 and the virtual CPU state 124 may be different. It may be desirable to synchronize the virtual machine function memory with the updated virtual CPU state 124 so that they are consistent with each other. Before hypervisor 108 transfers control to kernel code 202, synchronizer 119 may synchronize the virtual machine function memory with the updated guest virtual CPU state 128 such that the virtual machine function memory matches the state stored in guest virtual CPU state 128, including the state stored in the virtual CPU cache. In an example, synchronizer 119 maintains its own state of CPU 104 (or of virtual CPU 112-1) in virtual machine function memory 107 and updates this to match guest virtual CPU state 128, which was modified by virtual machine function 204 while performing the access on behalf of the guest. After this synchronization, the virtual machine function memory and the virtual CPU state 124 may store the same state for virtual CPU 112-1.

It should also be understood that the disclosure can apply to not only the virtual machine function and kernel code discussed in the examples, but to any code that runs within the guest. For example, the guest may include first code that is responsible for executing particular instructions (e.g., virtual machine function commands) and second code that includes the remaining code within the guest (the first and second code may be mutually exclusive code portions within the guest), and the first code may be associated with the first set of hypervisor page tables and the second code may be associated with the second set of hypervisor page tables. Additionally, the virtual machine function code and/or kernel code may run with or without supervisor privileges within the guest.

Moreover, it should be understood that various mechanisms may be employed to switch between hypervisor page tables. In an example, the hypervisor may activate this switching between hypervisor page tables. In another example, the guest may activate this switching between hypervisor page tables. For example, the guest may use a virtual machine function command to switch between hypervisor page tables.

Figure 3:
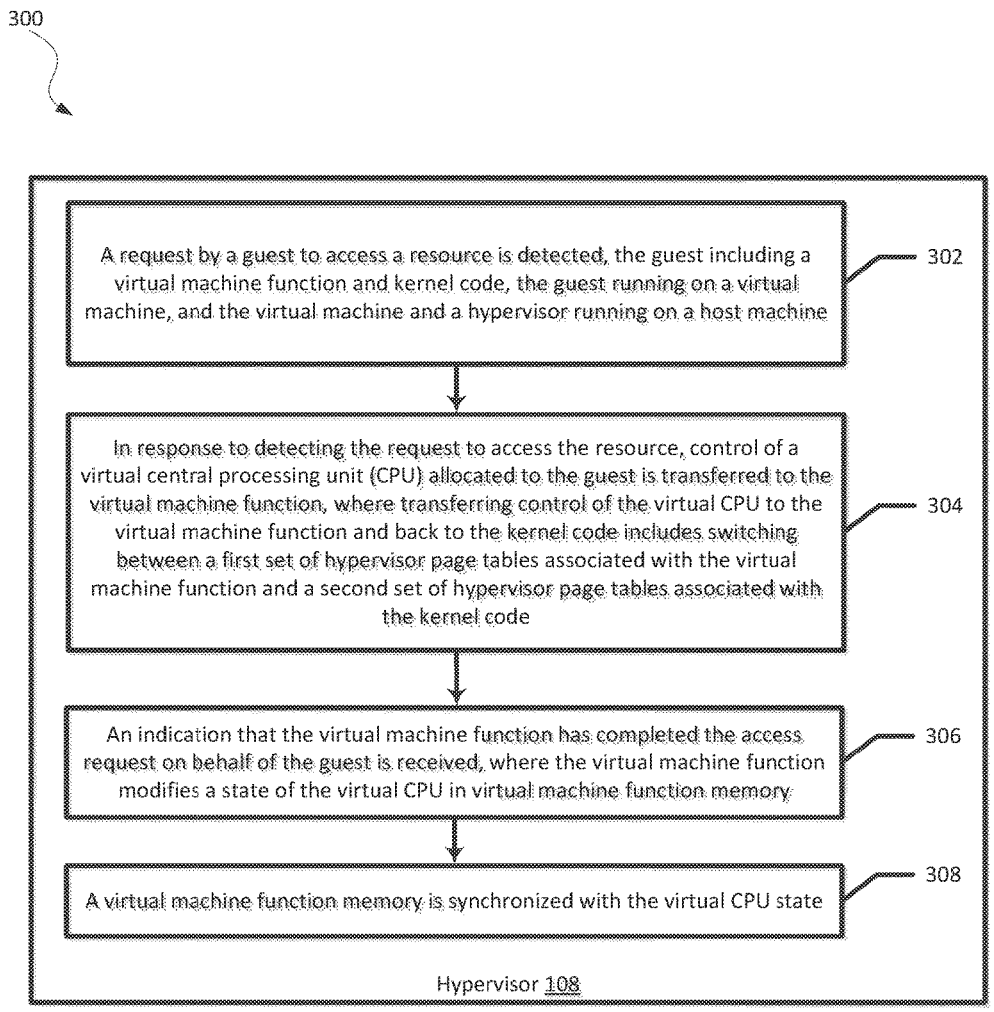
FIG. 3 is an example flowchart illustrating a method of emulating guest code by a virtual machine function.

FIG. 3 is an example flowchart illustrating a method 300 of emulating guest code by a virtual machine function. Method 300 is not meant to be limiting and may be used in other applications. Method 300 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 300 is performed by the system 100 illustrated in FIG. 1. For example, method 300 may be performed on host machine 102. In some examples, the order of the actions described below may also be performed according to alternative orderings. In yet other examples, additional actions may be added and actions that are described may be removed.

Method 300 includes blocks 302, 304, 306, and 308. In a block 302, a request by a guest to access a resource is detected by a hypervisor, the guest including a virtual machine function and kernel code, the guest running on a virtual machine, and the virtual machine and the hypervisor running on a host machine. In an example, control module 117 detects a request by guest 111-1 to access a resource (e.g., a memory resource), guest 111-1 including a virtual machine function 204 and kernel code 202, the guest 111-1 running on virtual machine 110-1, and the virtual machine 110-1 and hypervisor 108 running on host machine 102. The resource may be a privileged resource that guest 111-1 accesses via, for example, a hypercall or a privileged instruction. In some examples, the resource is memory. In an example, guest 111-1 sends a request to access memory that is not mapped to guest 111-1. In another example, guest 111-1 sends a request to write to a write-protected memory page. While guest 111-1 sends the access request, kernel code 202 may have control of virtual CPU 112-1, and virtual CPU 112-1 may be in the guest mode. In particular, this access request may be sent by kernel code 202, and may cause a virtual machine exit to the hypervisor. An exit to hypervisor 108 causes virtual CPU 112-1 to be in the hypervisor mode. Hypervisor 108 and virtual machine function 204 may communicate using para-virtualization.

In a block 304, in response to detecting the request to access the resource, control of a virtual CPU allocated to the guest is transferred to the virtual machine function, where transferring control of the virtual CPU to the virtual machine function and back to the kernel code includes switching between a first set of hypervisor page tables associated with the virtual machine function and a second set of hypervisor page tables associated with the kernel code. In an example, in response to detecting guest 111-1's request to access the resource, control module 117 transfers control of virtual CPU 112-1 allocated to guest 111-1 to virtual machine function 204, where transferring control of the virtual CPU to the virtual machine function and back to the kernel code includes switching between a first set of hypervisor page tables associated with the virtual machine function and a second set of hypervisor page tables associated with the kernel code. While virtual machine function 204 has control of virtual CPU 112-1, the virtual CPU is in the guest mode. The resource may be a memory resource.

Hypervisor 108 transfers control of virtual CPU 112-1 to virtual machine function 204 by reentering virtual machine 110-1. Upon reentry of the virtual machine, virtual machine function 204 executes. Virtual machine function 204 has access to virtual CPU state 124 (host virtual CPU state 126 and/or guest virtual CPU state 128) and further has access to guest memory 114-1 of virtual machine 110-1. Virtual machine function 204 may access host virtual CPU state 126 and perform the access request on behalf of the guest. As a result of performing the access request on behalf of the guest, virtual machine function 204 may modify guest virtual CPU state 128 in virtual machine function memory.

In an example, virtual machine function 204 wants guest 111-1 to start executing at a different instruction pointer address. In this example, virtual machine function 204 modifies this location in guest CPU state 128 to point to the new memory address. In another example, guest 111-1 sends a request to access a memory page that is write protected from modification by the guest, but is modifiable by virtual machine function 204. If guest 111-1 attempts to access such protected memory, hypervisor 108 may detect a page fault, transfer control to virtual machine function 204, and reenter the virtual machine, causing virtual machine function 204 to execute. Virtual machine function 204 may then execute the write to the particular memory page on behalf of the guest. In some examples, virtual machine function 204 includes an interrupt handler, and reentering the virtual machine may be accomplished by sending a virtual page fault interrupt to virtual machine function 204. Using this approach, general purpose registers may be stored on stack by CPU hardware, making it easier for virtual machine function 204 to access them.

Upon entry, virtual machine function 204 may access information from virtual CPU state 124 and validate it. In some examples, virtual machine function 204 retrieves the page fault or accesses the resource on behalf of the guest. For example, guest 111-1 may request to read from a guest physical address, causing a page fault. In this example, virtual machine function 204 may validate that the address accessed is valid for the guest. Virtual machine function 204 may read the requested value from the host if accessible by virtual machine function 204, remove any sensitive host information, retrieve the guest instruction pointer, locate the instruction executed (if necessary, executing guest page walk), and/or locate the register used. Virtual machine function 204 may store the information in virtual CPU state 124 at the offset corresponding to the correct register. As will be explained further below, after returning from virtual machine function 204, the value may be loaded into the correct register during the synchronization process. In another example, guest 111-1 may request to write to a memory page, causing a page fault. In this example, control module 117 may store details of the guest's access request (e.g., value to be written into memory, memory address, etc.) into host virtual CPU state 126. Virtual machine function 204 may read from host virtual CPU state 126, load the value to be written into memory, and validate that the value is valid. If the value is valid, virtual machine function 204 may write the value to the appropriate address on behalf of the guest.

In some examples, control module 117 may emulate one or more instructions by using a length of the instruction that caused the page fault or the exit from the virtual machine to the hypervisor. In an example, control module 117 updates the instruction pointer by incrementing it by the instruction length in virtual CPU state 124. In this example, incrementing the instruction pointer causes the current instruction to be skipped and a virtual machine exit (e.g., by hypercall or a special instruction). In this way, the instruction may be referenced so that guest 111-1 can receive the next instruction. Basically, whatever was done in hypervisor, by storing guest cpu state and host cpu state in shared memory, we can now do it by the virtual machine function. So it has some performance costs, but it is more secure. Basically, whatever was done in hypervisor, by storing guest cpu state and host cpu state in shared memory, we can now do it by the virtual machine function. So it has some performance costs, but it is more secure.

In a block 306, an indication that the virtual machine function has completed the access request on behalf of the guest is received by the hypervisor, where the virtual machine function modifies a state of the virtual CPU in virtual machine function memory. In an example, synchronizer 119 receives an indication that virtual machine function 204 has completed the access request on behalf of guest 111-1, where virtual machine function 204 modifies a state of virtual CPU 112-1. In some examples, synchronizer 119 receives the indication that virtual machine function 204 has completed the access request on behalf of guest 111-1 by receiving a request from virtual machine function 204 to transfer control of virtual CPU 112-1 to kernel code 202.

In a block 308, a virtual machine function memory is synchronized with the virtual CPU state by the hypervisor. In an example, synchronizer 119 synchronizes virtual machine function memory 107 with virtual CPU state 124. Hypervisor 108 may perform this synchronization automatically, or may synchronize based on receiving a special instruction to do so. The synchronization of virtual CPU state 124 with virtual machine function memory 107 may refer to the virtual machine function memory matching the state of the virtual processors (including the data stored in the virtual CPU caches). After receiving the request to transfer control of virtual CPU 112-1 to kernel code 202, synchronizer 119 may synchronize virtual machine function memory 107 with virtual CPU state 124. Additionally, after synchronizing virtual machine function memory 107 with virtual CPU state 124, control module 119 may transfer control of virtual CPU 112-1 to kernel code 202.

In an example, CPU 104 is an Intel® processor, and CPU 104 stores host virtual CPU state 126 and guest virtual CPU state 128 in hypervisor memory 109. CPU 104 may cache at least some of host virtual CPU state 126 and/or guest virtual CPU state 128. To access host virtual CPU state 126 and/or guest virtual CPU state 128 through virtual CPU state 124, hypervisor 108 may execute special instructions to synchronize the virtual machine function memory with them. For example, hypervisor 108 may execute special instructions to flush host virtual CPU state 126 and/or guest virtual CPU state 128 into virtual machine function memory. In another example, hypervisor 108 executes special instructions to read host virtual CPU state 126 and/or guest virtual CPU state 128 into general purpose registers of hypervisor 108, and then synchronizes the virtual machine function memory with them.

While virtual machine function 204 executes the request on behalf of the guest, virtual machine function 204 may maintain a list of the modifications virtual machine function 204 makes to virtual CPU state 124. In an example, virtual machine function 204 provides this list of modifications made by the virtual machine function to virtual CPU state 124 to hypervisor 108. Synchronizer 119 may receive the list of modifications made by virtual machine function 204 to virtual CPU state 124 and synchronize virtual machine function memory 107 in accordance with the list of modifications. For example, synchronizer 119 may update the virtual machine function memory to reflect the updated data stored in virtual CPU state 124.

It is also understood that additional processes may be performed before, during, or after blocks 302, 304, 306, and/or 308 discussed above. For example, virtual machine function 204 may request a switch back to kernel code 202. In response to this request, control module 117 may transfer control to kernel code 202. In an example, hypervisor 108 transfers control of virtual CPU 112-1 to kernel code 202.

Figure 4:
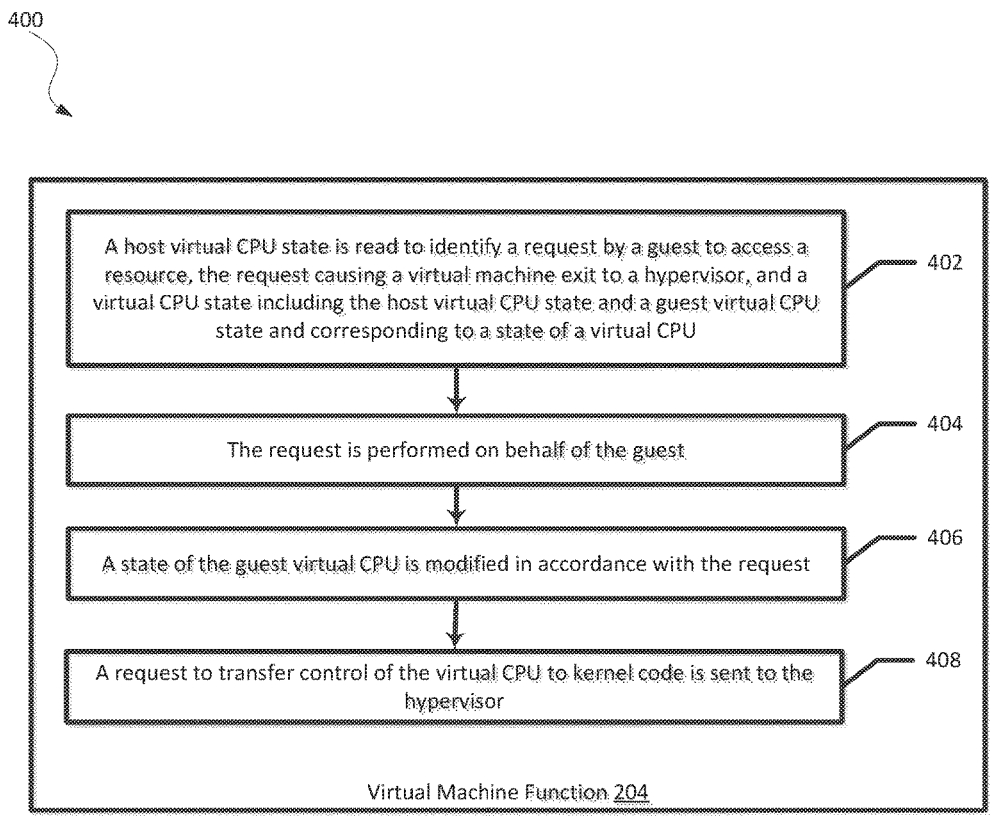
FIG. 4 is an example flowchart illustrating a method of accessing a resource on behalf of a guest in accordance with a request.

FIG. 4 is an example flowchart illustrating a method 400 of accessing a resource on behalf of a guest in accordance with a request by the guest. Method 400 is not meant to be limiting and may be used in other applications. Method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 400 is performed by the system 100 illustrated in FIG. 1 or the system 200 illustrated in FIG. 2. For example, method 400 may be performed on host machine 102. In some examples, the order of the actions described below may also be performed according to alternative orderings. In yet other examples, additional actions may be added and actions that are described may be removed.

Method 400 includes blocks 402, 404, 406, and 408. In a block 402, a host virtual CPU state is read to identify a request by a guest to access a resource, the request causing a virtual machine exit to a hypervisor, and a virtual CPU state including the host virtual CPU state and a guest virtual CPU state and corresponding to a state of a virtual CPU. The resource may be a memory resource. In an example, virtual machine function 204 reads host virtual CPU state 126 to identify a request by guest 111-1 to access a resource, the request causing a virtual machine exit to hypervisor 108, and virtual CPU state 124 including host virtual CPU state 126 and guest virtual CPU state 128 and corresponding to a state of virtual CPU 112-1.

In a block 404, the request is performed on behalf of the guest. In an example, virtual machine function 204 performs the request on behalf of guest 111-1. Virtual machine function 204 may include the emulation code that performs the request on behalf of the guest. In a block 406, a state of the guest virtual CPU state is modified in accordance with the request. In an example, virtual machine function 204 modifies guest virtual CPU state 128 in virtual machine function memory in accordance with the request. In a block 408, a request to transfer control of the virtual CPU to kernel code is sent to the hypervisor. In an example, virtual machine function 204 sends to hypervisor 108 a request to transfer control of virtual CPU 112-1 to kernel code 202. After receiving the request from virtual machine function 204 to transfer control of virtual CPU 112-1 to kernel code 202, synchronizer 119 may synchronize the virtual machine function memory with the guest virtual CPU state 128 modified by virtual machine function 204. It is also understood that additional processes may be performed before, during, or after blocks 402, 404, 406, and 408 discussed above.

Figure 5:
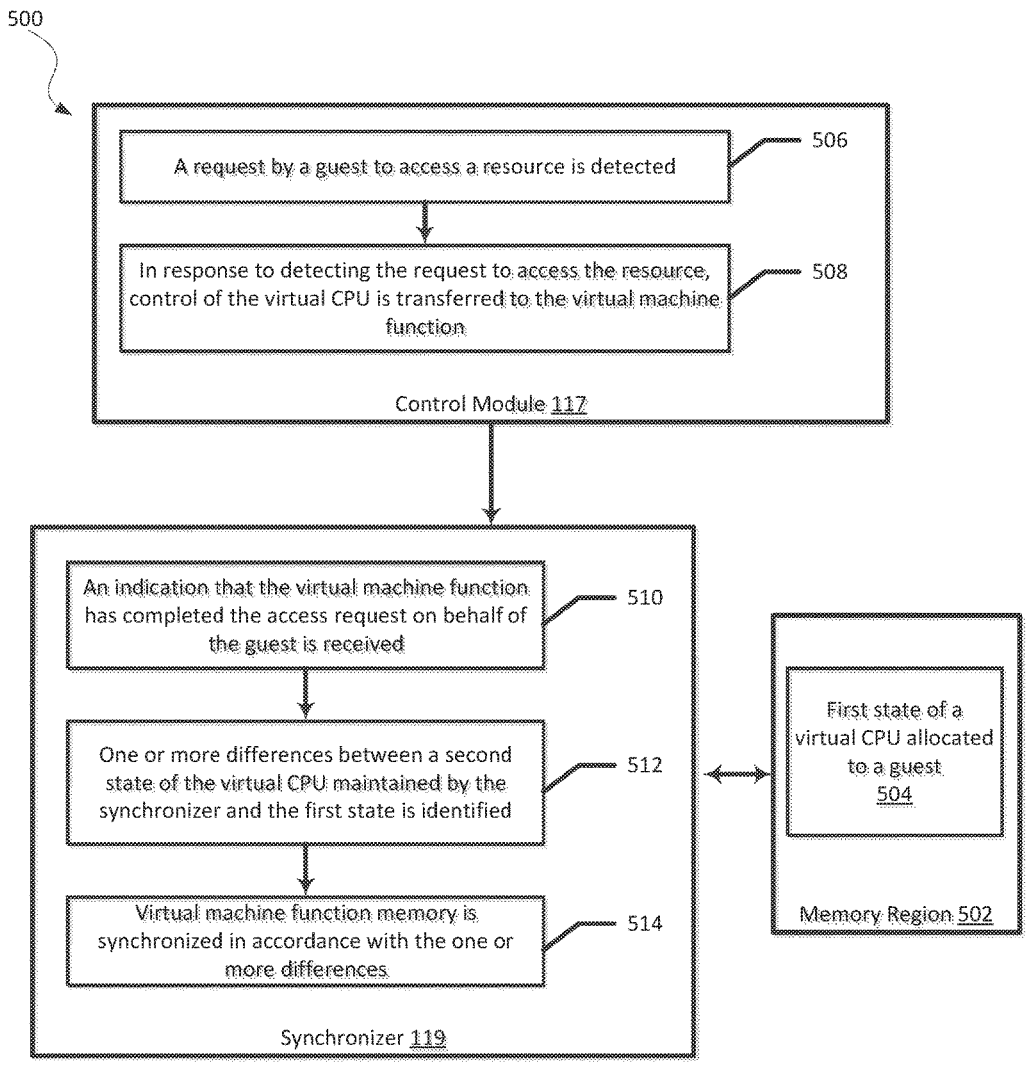
FIG. 5 is an example block diagram illustrating a system for guest code emulation by a virtual machine function.

FIG. 5 is an example block diagram illustrating a system 500 for guest code emulation by a virtual machine function. FIG. 5 includes a memory region 502, control module 117, and synchronizer 119. Memory region 502 may be shared between hypervisor 108 and virtual machine function 204 and stores first state 504, which is a state of virtual CPU 112-1.

In a block 506, a request by the guest to access a resource is detected. In an example, control module 117 detects a request by guest 111-1 to access a resource. In a block 508, in response to detecting the request to access the resource, control of the virtual CPU is transferred to the virtual machine function. In an example, in response to detecting the request to access the resource, control module 117 transfers control of virtual CPU 112-1 to virtual machine function 204. In a block 510, an indication that the virtual machine function has completed the access request on behalf of the guest is received. In an example, synchronizer 119 receives an indication that virtual machine function 204 has completed the access request on behalf of guest 111-1. In a block 512, one or more differences between a second state of the virtual CPU maintained by the synchronizer and the first state is identified. In an example, synchronizer 119 identifies one or more differences between a second state of the virtual CPU maintained by synchronizer 119 and first state 504. The second state of the virtual CPU may be stored in virtual machine function memory. In a block 514, virtual machine function memory is synchronized in accordance with the one or more differences. In an example, synchronizer 119 synchronizes virtual machine function memory 107 in accordance with the one or more differences.

As discussed above and further emphasized here, FIGS. 1-5 are merely examples, which should not unduly limit the scope of the claims.

Figure 6:
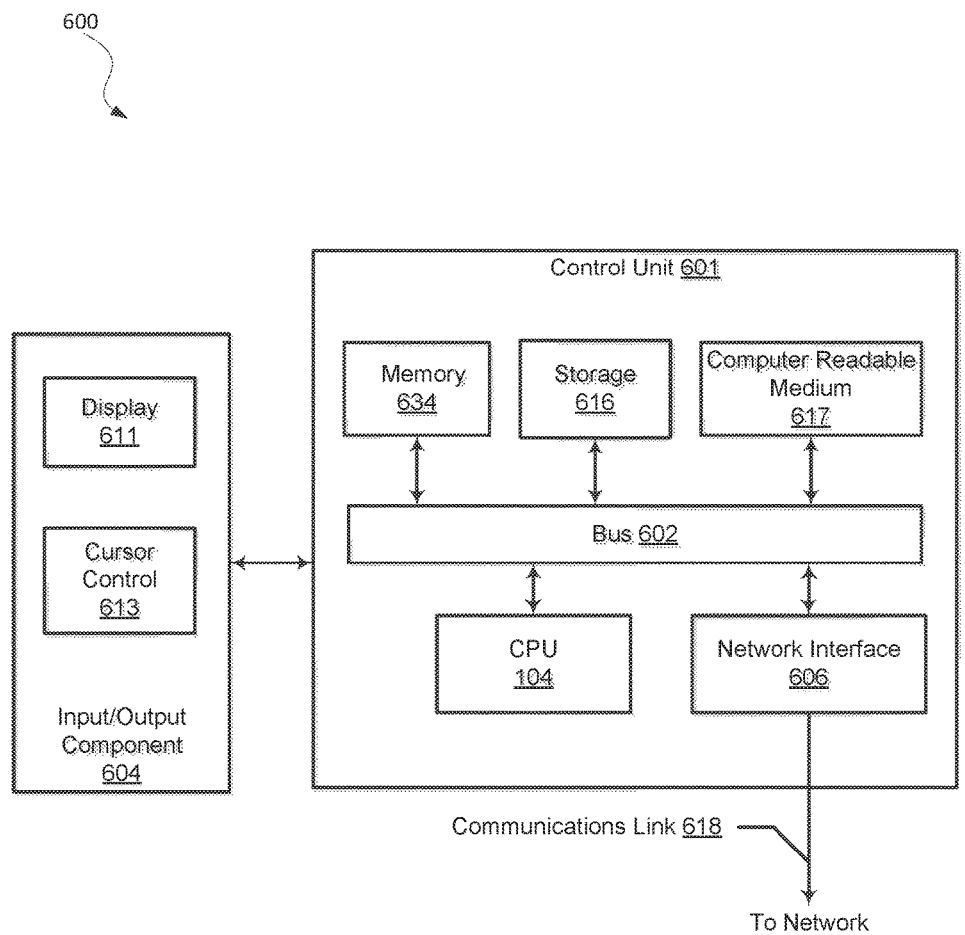
FIG. 6 is a block diagram of a computer system suitable for implementing one or more examples of the present disclosure.

FIG. 6 is a block diagram of a computer system 600 suitable for implementing one or more examples of the present disclosure. In various implementations, computer system 600 corresponds to host machine 102, which may include a client or a server computing device. The client or server computing device may include a plurality of processors. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. In an example, a user may interact with a host computing system using I/O component 604 and cause virtual machine 110 to launch. In this example, the hypervisor may provide virtual machine function 204 with access to virtual CPU state 124. I/O component 604 may also include an output component such as a display 611, and an input control such as a cursor control 613 (such as a keyboard, keypad, mouse, etc.).

A transceiver or network interface 606 transmits and receives signals between computer system 600 and other devices via a communications link 618 to a network. In an examples, the transmission is wireless, although other transmission mediums and methods may also be suitable, CPU 104, which may be a micro-controller, digital signal processor (DSP), or other processing component, processes these various signals, such as for display on computer system 600 or transmission to other devices via communications link 618. CPU 104 may also control transmission of information, such as cookies or IP addresses, to other devices.

Components of computer system 600 also include a system memory component 634 (e.g., RAM), a static storage component 616 (e.g., ROM), and/or a disk drive 617. System memory component 634 may include memory 634. Computer system 600 performs specific operations by CPU 104 and other components by executing one or more sequences of instructions contained in system memory component 634. Logic may be encoded in a computer readable medium, which may refer to any medium that participates in providing instructions to CPU 104 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an example, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples, execution of instruction sequences (e.g., method flow 300, and/or method flow 4600) to practice the present disclosure may be performed by computer system 600. In various other examples, a plurality of computer systems 600 coupled by communication links 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps or actions described herein may be changed, combined into composite steps or composite actions, and/or separated into sub-steps or sub-actions to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of emulating guest code by a virtual machine function, comprising:
    detecting, by a hypervisor, a request by a guest to access a memory resource, the guest including the virtual machine function and kernel code and running on a virtual machine, and the virtual machine and the hypervisor running on a host machine;
    in response to detecting the request to access the memory resource:
        transferring, by the hypervisor, control of a virtual central processing unit (CPU) allocated to the guest to the virtual machine function; and
        activating a first set of hypervisor page tables associated with the virtual machine function, wherein the first set of hypervisor page tables specifies that a first guest virtual CPU state of the virtual CPU is writable, wherein a second set of hypervisor page tables associated with the kernel code specifies that the first guest virtual CPU state is write protected, and wherein at most one of the first and second sets of hypervisor page tables is active at a time;
    after transferring control of the virtual CPU to the virtual machine function, receiving, by the hypervisor, an indication that the virtual machine function has completed the access request and modified the first guest virtual CPU state; and updating, by the hypervisor, a second guest virtual CPU state of the virtual CPU with the first guest virtual CPU state.

2. The method of claim 1, wherein a first virtual CPU state includes the first guest virtual CPU state and a host virtual CPU state.

3. The method of claim 2, further comprising:
setting, by the hypervisor, the first guest virtual CPU state to a writeable mode; and
setting, by the hypervisor, the host virtual CPU state to a read-only mode.

4. The method of claim 1, further comprising:
receiving, by the hypervisor, a list of modifications made by the virtual machine function to the first guest virtual CPU state, wherein the updating includes updating a virtual machine function memory storing the second guest virtual CPU state in accordance with the list of modifications.

5. The method of claim 1, wherein receiving the indication that the virtual machine function has completed the access request includes receiving a request from the virtual machine function to transfer control of the virtual CPU to the kernel code, wherein the updating includes before transferring control of the virtual CPU to the kernel code, updating the second guest virtual CPU state stored in the virtual machine function memory with the first guest virtual CPU state.

6. The method of claim 1, wherein the virtual CPU is restricted by access permissions specified in the active set of hypervisor tables, wherein the first set of hypervisor page tables grants the virtual CPU permission to access the memory resource in accordance with the access request, and wherein the second set of hypervisor page tables does not grant the virtual CPU permission to access the memory resource in accordance with the access request.

7. The method of claim 1, further comprising:
copying, by the hypervisor, at least a portion of the first virtual CPU state into a shared memory shared between the hypervisor and the virtual machine function, wherein the receiving an indication includes receiving the indication that the virtual machine function modified the first guest virtual CPU state stored in the shared memory, wherein before the detecting the request, the first guest virtual CPU state is the same as the second guest virtual CPU state, and after receiving the indication, the first guest virtual CPU state is different from the second guest virtual CPU state.

8. A system for emulating guest code by a virtual machine function, comprising:
at least one processor;
a first memory region that stores a first state of a virtual central processing unit (CPU) allocated to a guest, wherein the guest runs on a virtual machine and includes the virtual machine function and kernel code, and wherein the first state includes a host virtual CPU state of the virtual CPU and a first guest virtual CPU state of the virtual CPU;
a second memory region that stores a second guest virtual CPU state of the virtual CPU;
a third memory region that stores first and second sets of hypervisor page tables, wherein the virtual CPU is restricted by access permissions specified in an active set of hypervisor tables, wherein the first set of hypervisor page tables is associated with the virtual machine function and specifies that the first guest virtual CPU state is writable, wherein the second set of hypervisor page tables is associated with the kernel code and specifies that the first guest virtual CPU state is write protected, and wherein at most one of the first and second sets of hypervisor page tables is active at a time;
a control module that detects a request by the guest to access a memory resource and activates the first set of hypervisor page tables; and
a synchronizer that
receives an indication that the virtual machine function has completed the access request and modified the first guest virtual CPU state,
identities one or more differences between the second guest virtual CPU state and the first guest virtual CPU state, and
synchronizes the second guest virtual CPU state in accordance with the identified one or more differences.

9. The system of claim 8, wherein a hypervisor includes the control module and the synchronizer, and wherein the first and second sets of hypervisor page tables specify that the host virtual CPU state is write protected.

10. The system of claim 9, wherein the virtual machine function reads the host virtual CPU state and accesses the memory resource in accordance with the read host virtual CPU state.

11. The system of claim 10, wherein the control module stores an exit status indicating a cause of a virtual machine exit associated with the access request into the host virtual CPU state.

12. The system of claim 10, wherein the virtual machine function reads from the host virtual CPU state to determine the cause of a virtual machine exit associated with the access request.

13. The system of claim 12, wherein the virtual machine function determines that the cause of the virtual machine exit was a write to a set of memory pages, and the virtual machine function performs the requested write to the set of memory pages, wherein the first set of hypervisor page tables grants the virtual CPU permission to write to the set of memory pages, and wherein the second set of hypervisor page tables does not grant the virtual CPU permission to write to the set of memory pages.

14. The system of claim 12, wherein the virtual machine function determines that the cause of the virtual machine exit was a request to access an input/output (I/O) port, wherein the virtual machine function performs the requested access to the I/O port, wherein the first set of hypervisor page tables grants the virtual CPU permission to access the I/O port, and wherein the second set of hypervisor page tables does not grant the virtual CPU permission to access the I/O port.

15. The system of claim 9, wherein the virtual machine function modifies the first guest virtual CPU state in accordance with the access request.

16. The system of claim 15, wherein after the virtual machine function completes the access request, the virtual machine function sends a request to the hypervisor to transfer control of the virtual CPU to the kernel code.

17. The system of claim 15, wherein after the synchronizer synchronizes the second guest virtual CPU state in accordance with the one or more differences, the first and second guest virtual CPU states are the same and the control module activates the second set of hypervisor tables, wherein the first set of hypervisor page tables grants the virtual CPU permission to access the memory resource in accordance with the access request, and wherein the second set of hypervisor page tables does not grant the virtual CPU permission to access the memory resource in accordance with the access request.

18. The system of claim 9, wherein the second memory region is non-modifiable by the guest.

19. The system of claim 8, wherein the hypervisor copies the host virtual CPU state to a fourth memory region shared between the hypervisor and the virtual machine function, and the virtual machine function reads the host virtual CPU state stored in the fourth memory region.

20. A non-transitory machine-readable medium comprising a plurality of machine-readable instructions that when executed by one or more processors is adapted to cause the one or more processors to perform a method comprising:

detecting, by a hypervisor, a request by a guest to access a memory resource, the guest including a virtual machine function and kernel code and running on a virtual machine, and the virtual machine and the hypervisor running on a host machine;

in response to detecting the request to access the memory resource:

transferring, by the hypervisor, control of a virtual central processing unit (CPU) allocated to the guest to the virtual machine function; and activating a first set of hypervisor page tables associated with the virtual machine function, wherein the first set of hypervisor page tables specifies that a first guest virtual CPU state of the virtual CPU is writable, wherein a second set of hypervisor page tables is associated with the kernel code and specifies that the first guest virtual CPU state is write protected, and wherein at most one of the first and second sets of hypervisor page tables is active at a time;

after transferring control of the virtual CPU to the virtual machine function, receiving, by the hypervisor, an indication that the virtual machine function has completed the access request and modified the first guest virtual CPU state; and updating, by the hypervisor, a second guest virtual CPU state of the virtual CPU with the first guest virtual CPU state.

\* \* \* \* \*